Jan. 23, 1968  F. J. SANTANGELO  3,364,638
COMPOSITE PLASTIC AND CORRUGATED PANEL
Filed Aug. 2, 1965
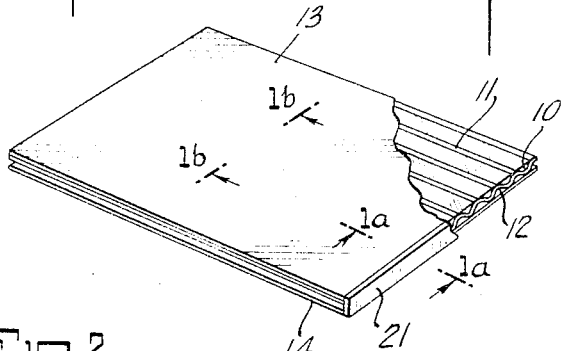
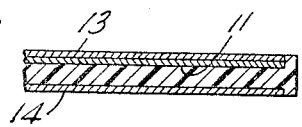
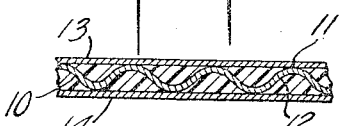
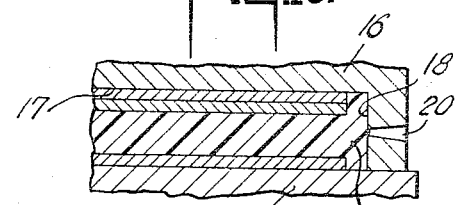
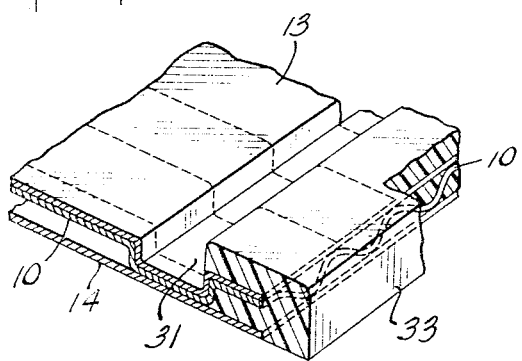
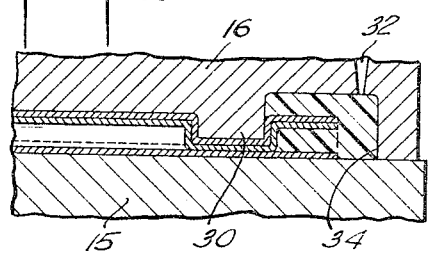
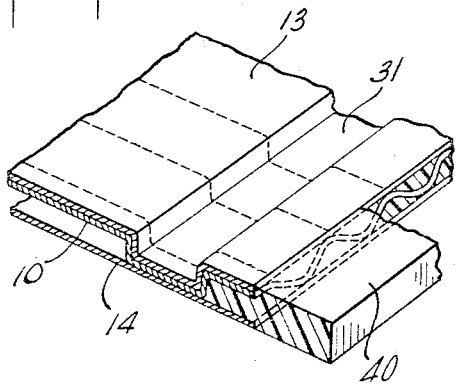
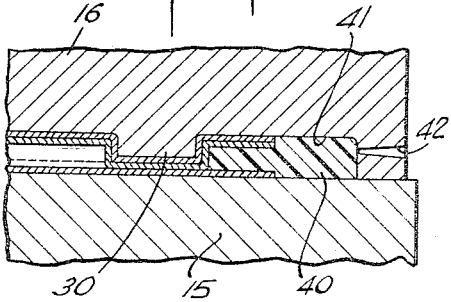
INVENTOR.
FRANCIS J. SANTANGELO
BY
ATTORNEY

# United States Patent Office 3,364,638
Patented Jan. 23, 1968

3,364,638
COMPOSITE PLASTIC AND CORRUGATED PANEL
Francis J. Santangelo, Middlesex, N.J., assignor to Johnson & Johnson, a corporation of New Jersey
Filed Aug. 2, 1965, Ser. No. 476,509
3 Claims. (Cl. 52—309)

ABSTRACT OF THE DISCLOSURE

A composite plastic and corrugated board panel is formed by injection molding thermoplastic material into longitudinal cells formed, on the one hand, by alternate ridges and furrows of a corrugated member and, on the other hand, by the inner face of a facing element located on one or both sides of the corrugated member and extending from ridge to ridge to bridge the intervening furrows, the plastic material being injected throughout the length, or for a limited distance only from the ends, of the longitudinal cells.

Brief summary of invention

According to one aspect of the invention corrugated sheet material with alternate ridges and furrows on its opposite sides is provided on one or both faces with a panel of sheet material spanning the ridges from top to top so as to define with the furrows of the corrugated sheet a multiplicity of longitudinal cells into which a thermoplastic material adhesively compatible with the facing sheet material and with the corrugated sheet material is injection molded to produce a composite panel of substantial strength and rigidity. During the injection molding operation the ridges of the corrugated sheet material are buttressed on both sides by the walls of the mold itself either directly or with a sheet of facing material interposed between the ridges and the mold wall when the longitudinal cells are formed by a facing sheet and the corrugated sheet.

According to a different aspect of the invention, the furrows are pinched off transversely in a region spaced somewhat inwardly from an end of the panel and filled from such end only up to the pinched off region. Such a construction in effect provides a panel of corrugated material with a marginal structural member for strength, the structural member having the same thickness as the panel material or greater thickness as desired.

A better understanding of the invention may be had from the following description read with the accompanying drawings wherein:

FIG. 1 is a perspective view of a composite corrugated board with furrows between facing panels, the furrows being filled with an injection molded plastic material in accordance with the invention.

FIG. 1a is a fragmental longitudinal sectional view on line 1a—1a of FIG. 1;

FIG. 1b is a fragmental transverse sectional view of line 1b—1b of FIG. 1;

FIG. 1c is a fragmental longitudinal sectional view of a panel similar to FIG. 1a but prior to its removal from the die in which it is molded;

FIG. 2 is a fragmental perspective view of a composite panel of corrugated board and plastic material with the plastic material filling the furrows in a marginal portion only of the panel;

FIG. 2a is a fragmental transverse sectional view through an injection mold of a type appropriate for making the product of FIG. 2;

FIG. 3 is a fragmental perspective view of still another embodiment of the invention in which a marginal structural element is provided having the same thickness as the corrugated paneling per se; and FIG. 3a is a fragmental transverse sectional view through an injection mold of a type appropriate for making the product of FIG. 3.

In a preferred embodiment of the invention (FIGS. 1, 1a, 1b and 1c) a corrugated panel comprising a median element 10 with longitudinally extending ridges 11 and furrows 12 on one side with complimentary furrows and ridges on the other side is disposed between flat face panels 13 and 14 secured to such ridges at their peaks to define longitudinal cells. Such an assembly, which may be paper, is disposed on the bed plate 15 of a mold having a cap section 16 with recess 17 to accommodate the thickness of the assembly. The mold construction may be such that the panel, assuming it to be rectangular, abuts edges of the mold recess 17 along three edges, and is buttressed by the mold at its top and bottom faces. A fourth edge of the panel which extends transversely of the ridges and furrows, stands clear of an adjacent wall 18 of the mold recess 17 so as to present a passageway or channel 19 common to all the furrows of the panel. A gate 20 extending through the mold cap communicating with this passageway permits a thermoplastic material in molten condition to be injected into the common passageway 19 and hence into the cells defined by the furrows and adjacent face board communicating therewith to produce a panel in which the cells throughout their length are filled with plastic material. Upon removal of the panel from the mold, there will be a section 21 of plastic material at its end whose dimensions accord with those of the common passageway that communicates with the cells.

In the embodiment of FIG. 1, the furrowed median element 10 of the corrugated assembly is buttressed at the ridge peaks by the flat top and bottom facing panels 13 and 14. The invention contemplates that the ridge peaks may be buttressed by the mold walls directly if no face boards are desired or by the mold wall on one side and by a facing board on the other side if only one facing board is desired.

The invention also contemplates that the median element and the face panels be loosely assembled in the mold for joining into a unitary structure by the molding operation. Adhesive compatibility between median and face panel materials and the injected plastic material insures a unitary structure between all the parts upon removal of the completed product from the mold.

It should be understood, of course, that the composite panel may and most likely will be part of a container or other unitary structure, containing one or more of the improved panels, the container or other structure being molded in its entirety as a unitary structure simultaneously with the construction of the improved paneling with corrugated board. A container of the type in which the improved panel has utility is described in R. F. Schenk et al. Patent 3,119,540 issued January 28, 1964.

A modification of the invention in which the furrows are filled for only a portion of their length is illustrated in FIGS. 2 and 2a. The paneling includes a median corrugated element 10 with facing board 13 and 14 on opposite sides extending from ridge peak to ridge peak and spanning the furrows. The parts are located in a mold with facing board 14 at the bottom buttressed by mold bed 15 and facing board 13 at the top buttressed by mold cap 16. For this embodiment of the invention, mold cap 16 is formed with a boss 30 extending transversely of the corrugations and which projects downwardly from the top wall of the mold. When the mold is closed, boss 30 deforms top facing board 13 and corrugated median 10 to pinch off the furrows in a region 31 spaced a distance inwardly from the end of the panel. The marginal portions of median 10 and facing boards 13 and 14 adjacent the pinched off region extend into a mold cavity into which plastic material in molten condition is injected through an appropriate gate 32 to form a plastic structural element 33 conforming when the unit is removed from the mold, to the shape of a mold cavity 34.

A marginal portion of flexible paneling material risks deformation during an injection molding operation if it extends into a mold cavity unsupported by a section of the cavity wall unless special precautions are taken to minimize the risk.

In the embodiment of the invention illustrated in FIGS. 2 and 2a such risks are minimized by the interconnection which exist between the median corrugated member and the opposed panel facing members. These interconnections may be adhesive with location at the peaks of the ridges adjacent both the top and the bottom facing panels and act to give the top marginal facing panel portion and the adjacent corrugated median member portion which otherwise would lack mold wall support, the necessary stiffness and strength to resist deformation from the molten plastic as it flows into the mold under high pressure.

The embodiment of the invention illustrated in FIGS. 3 and 3a is much the same as that shown in FIGS. 2 and 2a and the corresponding parts are similarly numbered. It differs, however, in that a marginal plastic structural member 40 shaped in a mold cavity 41 by injection molding through a gate 42, has the same thickness as the body portion of the panel to the left of depressed region 31 and which is devoid of plastic material.

Where a plastic member after molding has a tendency to shrink and where such member is adherred at one face only to paneling material which resists shrinkage, there is a tendency on occasions for such a structural member to warp. This phenomenon is more fully explained in my pending application entitled Composite Panel, J&J 421 filed the same date as this. In the embodiment of the invention illustrated in FIGS. 3 and 3a, there are equivalent adhesive areas adjacent both faces of the plastic member, i.e., where it adheres to the opposed inner faces of the facing panels 13 and 14 and at the opposite faces of the median corrugated board 10. With this construction, all shrinkage forces are balanced out thereby to eliminate warpage in the plastic marginal element.

Any appropriate thermoplastic material which can be injection molded will suffice in practicing the invention. Polyethylene, polypropylene, styrene, etc. are suggested by way of example. Any appropriate material suitable for corrugated board and to which the plastic material can be united will suffice for the paneling material.

The invention has been illustrated in connection with preferred embodiments thereof but other embodiments are included within its spirit. It is to be limited only by the scope of the appended claims.

What is claimed is:

1. A composite panel of corrugated board and plastic material which comprises a corrugated section of board with alternate ridges and furrows, a facing board bridging the furrows on both sides of the corrugated board and secured to and in contact with said corrugated board along the tops of adjacent ridges thereof, a multitude of separate longitudinal cells in the regions of the furrows spaced along the panel on opposite sides of the corrugated board in a direction at right angles to such cells and being defined each by the corrugated board and by a facing board on one of the opposite sides thereof, the facing board on one side of the panel and the underlying section of corrugated board being depressed toward the opposite facing board in an area extending transversely of said corrugations, said corrugated board in the depressed portion thereof presenting a vertical wall blocking off said longitudinal cells at a position spaced inwardly from one end of the composite panel and plastic material injection molded into said cells inwardly from said end and for a distance determined by the location of said blocking wall.

2. A composite panel of corrugated board and plastic material which comprises a corrugated section of board with alternate ridges and furrows, a facing sheet bridging the furrows on at least one side of the corrugated section and secured to said corrugated section along the tops of adjacent ridges thereof, a multiplicity of separate longitudinal cells in the region of the furrows spaced along the panel in a direction at right angles to such cells and defined each by the corrugated section and the facing sheet, said facing sheet and the underlying corrugated section being depressed below the face of said sheet and into the underlying furrows in an area extending transversely of said corrugations and disposed inwardly from an edge of the panel extending likewise transversely of said corrugations, and plastic material injection molded into said cells inwardly from said edge and for a distance determined by the location of said area.

3. A composite panel of corrugated board and plastic material according to claim 2 wherein the injection molded plastic material constitutes a rigidity imparting structural member at the edge of the panel having depth greater than the thickest dimension overall of the outside faces of the panel and wherein the face board in the region of said structural member is imbedded in said member in a position intermediate its top and bottom faces.

References Cited

UNITED STATES PATENTS

| | | | |
|---|---|---|---|
| 2,069,393 | 2/1937 | Sloan | 264—266 X |
| 2,912,940 | 11/1959 | Baroni | 52—309 |
| 3,026,575 | 3/1962 | Lusher et al. | 264—328 X |
| 3,051,277 | 8/1962 | Day | 52—618 X |
| 3,107,991 | 10/1963 | Taussig | 264—279 X |
| 3,219,743 | 11/1965 | Berler | 264—328 X |
| 3,246,066 | 4/1966 | Gits | 264—328 X |
| 3,258,877 | 7/1966 | Peras | 52—615 X |
| 3,276,115 | 10/1966 | Hansz | 264—266 X |
| 3,300,901 | 1/1967 | Eckel | 52—625 X |

FOREIGN PATENTS

| | | |
|---|---|---|
| 30,083 | 8/1922 | Denmark. |
| 754,299 | 8/1956 | Great Britain. |

DAVID J. WILLIAMOWSKY, *Primary Examiner.*

DENNIS TAYLOR, *Examiner.*